No. 860,813. PATENTED JULY 23, 1907.
H. LEITNER.
DYNAMO CONSTRUCTION.
APPLICATION FILED AUG. 9, 1905.
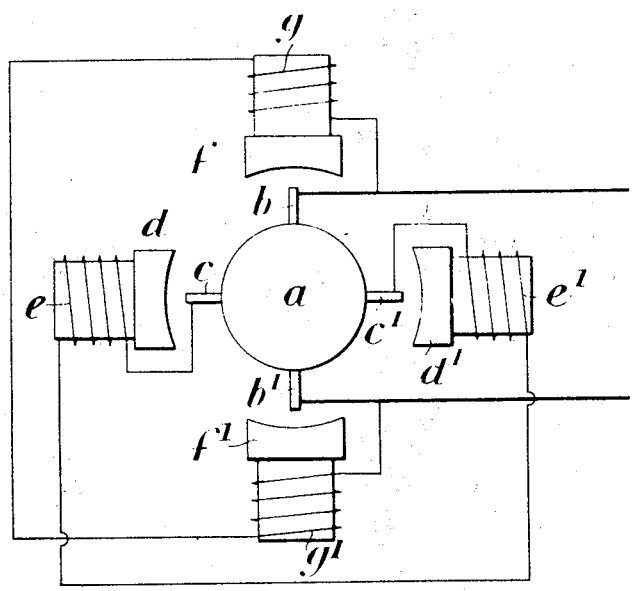
Witnesses Inventor

UNITED STATES PATENT OFFICE.

HENRY LEITNER, OF WOKING, ENGLAND.

DYNAMO CONSTRUCTION.

No. 860,813.

Specification of Letters Patent.

Patented July 23, 1907.

Application filed August 9, 1905. Serial No. 273,403.

*To all whom it may concern:*

Be it known that I, HENRY LEITNER, a subject of the King of Great Britain, residing at Maybury, Woking, Surrey, England, have invented new and useful Improvements in Dynamo Construction, of which the following is a specification.

The present invention refers to means for regulating direct current dynamos so as to render their output constant within certain limits in spite of any variations of the speed at which they may be driven. A machine regulated in such a manner is specially suited to the electric lighting of railway trains when mounted underneath the carriages to be lighted and driven by a belt or other convenient means from the axle of the said carriage a battery of accumulators being used in combination therewith in the usual and well known manner.

It will be understood that the principles of the invention may be readily applied to any multipolar direct current dynamo, but for the sake of simplicity and to enable the principles involved to be the more readily understood it will be described with reference to a two pole machine.

The general principle which is employed in carrying the invention into practical effect is to make use of subsidiary poles arranged between those poles of the machine which are excited from the main brushes and which will be accordingly referred to as the main poles of the machine these subsidiary poles being excited by a field winding supplied from additional brushes arranged to make contact with the commutator.

A secondary important feature is that the machine will excite to furnish current in the same sense or direction no matter in which direction the armature may be driven.

In order that my invention may be more fully understood, I will describe the same by reference to the accompanying drawings, in which:—

$a$ is the armature, $b$ and $b'$ the brushes from which the main current generated in the machine is taken off.

$c, c'$ are the brushes which provide current for exciting the so-called subsidiary poles $d, d'$ referred to above and these brushes $c, c'$ are connected to the field winding $e, e'$ which excites the said subsidiary poles.

The main poles $f, f'$ of the machine are provided with an ordinary shunt field winding $g, g$ connected to the main brushes $b, f'$ in the manner shown.

It is to be understood that the four brushes of the machine must be arranged in the position shown that is to say approximately in the center of each of the polar spans.

It is of course understood that in speaking of the position of the brushes it is assumed that the commutator bars from which the brushes collect are in line with the windings to which they are attached, as for example is usual in a Gramme ring. Where there is an angular displacement between the commutator bars and their corresponding windings the brushes obviously must be correspondingly displaced. It must also be understood that the so-called main poles of the machine must be possessed of residual magnetism and the magnetism of these poles however it may change in strength remains unreversed, whereas the magnetism of the so-called subsidiary poles changes in sign according to the direction of rotation of the armature, and the subsidiary poles should accordingly be of soft iron and laminated throughout.

The function of the machine is as follows:—Supposing the armature $a$ to be rotated clockwise the residual magnetism in the poles $f, f'$ produces a P. D. between the brushes $c, c'$ which immediately causes a current to flow in the field-windings $e, e'$ of the subsidiary poles $d, d'$ exciting these latter in such a sense that their action upon the armature $a$ produces a P. D. between the main brushes $b, b'$ with the result that the field windings $g, g'$ of the main poles $f, f'$ receive current in such a sense as to increase their residual magnetism. The increased magnetic flux of the "main poles" $f, f'$ acting upon the armature $a$ increases the current delivered by the brushes $c, c'$ to the field windings $e, e'$ of the subsidiary poles $d, d'$ and these interactions continue to increase till the P. D. of the main brushes $b, b'$ exceeds that of the battery of accumulators it is arranged to charge and operates the usual automatic cut-in and cut-out switch which establishes connection between the brushes $b, b'$ and the battery. As soon as the brushes $b, b'$ commence to deliver current to the external circuit, armature reactions are set up which markedly weaken the effective magnetism of the main poles $f, f'$ and in consequence the exciting current flowing in the field windings $e, e'$ of the subsidiary poles $d, d'$ and therefore in turn the current furnished by the brushes $b, b'$, the exciting current for the field windings $g, g$ derived from it being likewise proportionately weakened. It is therefore plain that the arrangements described have the result of utilizing the armature reaction caused by the production of useful current, to regulate automatically in a cumulative sense against any appreciable increase in the external or useful current in excess of the predetermined amount for which the machine has been designed or adjusted, whatever causes may conduce thereto, such as increased speed of rotation. The machine is therefore a machine the output of which within very wide limits does not increase with speed. When the machine is rotated in the opposite or anticlockwise direction it is manifest that the so-called subsidiary poles $d, d'$ are excited in the reverse sense and therefore change their polarity. As the direction of rotation is at the same time reversed the direction of current furnished by the main brushes $b, b'$ remains the same, and consequently the polarity of the main poles is unaffected and the whole series of interactions occur as previously described in reference to rotation in the clockwise direction.

The purely magnetic effect of the so-called subsidiary pole-pieces $d, d'$ on the main pole pieces $f, f'$ may be described as dislocating the field of the pole pieces $f, f'$ so that it is drawn towards the subsidiary pole pieces $d, d'$ in a direction opposed to the direction of rotation, (and thus P. D. is produced between the main brushes $b, b'$ as affected by the poles $f, f'$) whereas the armature reaction produced by the external current supplied from the brushes $b, b'$ opposes this dislocation by its tendency to distort the field in the direction of rotation proportionately to current and speed. But this distortion in bringing the so-called main poles towards their normal position diminishes the P. D. across the brushes $b, b'$ and therefore the output of the machine, and thus a condition of balance is produced which counteracts any tendency to increase of output with increasing speed.

It will be obvious that the presence of commencing magnetization in the poles $f, f'$ may be insured either by taking the current for the lamps the machine is designed to supply through an additional exciting winding in the known manner or by making the magnets wholly or partially of sufficiently hard material.

For purposes of better adjustment a differential or reverse compound winding may be employed on the poles $f, f'$, that is to say, the main current from the main brushes $b, b'$ is taken round the poles $f, f'$ in a direction weakening the same.

Having now particularly described and ascertained the nature of my said invention and in what manner the same is to be performed, I declare that what I claim is:—

1. A dynamo having field magnets in a shunt of the main circuit, and being also provided with subsidiary magnets having poles distinct and separate from the poles of the field magnets, and with fixed subsidiary brushes connected with the coils of the subsidiary magnets, substantially as described.

2. In a dynamo, the combination with the field magnets, armature and main line brushes, the coils of said magnets being in a shunt of the main line, of subsidiary magnets forming a subsidiary field and fixed subsidiary brushes connected to and supplying current to the coils of the subsidiary magnets, substantially as described.

3. In a dynamo, the combination with an armature, main line brushes and field magnets in a shunt of the main circuit, of subsidiary magnets having their poles in a plane intersecting the plane of the poles of the main magnets and subsidiary brushes connected to the coils of the subsidiary magnets, substantially as described.

4. In a dynamo, the combination with an armature, main line brushes and field magnets in a shunt of the main circuit, subsidiary magnets having their poles located in a plane intersecting the plane of the poles of the main magnets and subsidiary brushes connected with the coils of the subsidiary magnets, the brushes being located in a line bisecting the poles of their magnets, substantially as described.

HENRY LEITNER.

Witnesses:
 JOHN E. BOUSFIELD.
 C. G. REDFERN.